(12) United States Patent
Shiozaki et al.

(10) Patent No.: US 11,145,938 B2
(45) Date of Patent: Oct. 12, 2021

(54) SECONDARY BATTERY

(71) Applicant: Panasonic Intellectual Property Management Co., Ltd., Osaka (JP)

(72) Inventors: Tomoki Shiozaki, Osaka (JP); Daisuke Furusawa, Osaka (JP); Yuji Oura, Osaka (JP); Takahiro Takahashi, Osaka (JP); Takahito Nakayama, Osaka (JP); Hideharu Takezawa, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 98 days.

(21) Appl. No.: 16/582,312

(22) Filed: Sep. 25, 2019

(65) Prior Publication Data
US 2020/0020921 A1   Jan. 16, 2020

Related U.S. Application Data

(63) Continuation of application No. PCT/JP2018/004363, filed on Feb. 8, 2018.

(30) Foreign Application Priority Data

Mar. 31, 2017  (JP) .............................. JP2017-071376

(51) Int. Cl.
*H01M 50/531* (2021.01)
*H01M 4/131* (2010.01)
(Continued)

(52) U.S. Cl.
CPC ......... *H01M 50/531* (2021.01); *H01M 4/131* (2013.01); *H01M 4/628* (2013.01);
(Continued)

(58) Field of Classification Search
CPC ........ H01M 4/131; H01M 4/525; H01M 4/62; H01M 4/621; H01M 4/624; H01M 4/628;
(Continued)

(56) References Cited

U.S. PATENT DOCUMENTS

2009/0325065 A1   12/2009 Fujii et al.
2010/0081062 A1    4/2010 Chiga et al.
(Continued)

FOREIGN PATENT DOCUMENTS

JP   2007-299541 A   11/2007
JP   2009-289414 A   12/2009
(Continued)

OTHER PUBLICATIONS

English translation of JP Publication 2013-045659, Mar. 2013.*
International Search Report dated Apr. 24, 2018, issued in counterpart application No. PCT/JP2018/004358. (4 pages).

*Primary Examiner* — Brittany L Raymond
(74) *Attorney, Agent, or Firm* — Westerman, Hattori, Daniels & Adrian, LLP

(57) ABSTRACT

According to the present invention, a positive electrode is provided with: a positive electrode current collector; a positive electrode active material layer which contains a positive electrode active material that is configured from a lithium transition metal oxide; a protective layer which is arranged between the positive electrode current collector and the positive electrode active material layer; and a positive electrode tab which is bonded with the positive electrode current collector at a positive electrode tab bonding part where the positive electrode active material layer and the protective layer are not formed so that the positive electrode current collector is exposed. An end edge of the positive electrode active material layer facing the positive electrode tab and an end edge of the protective layer facing
(Continued)

the positive electrode tab are arranged in different positions in the longitudinal direction of the positive electrode.

14 Claims, 4 Drawing Sheets

(51) Int. Cl.
*H01M 4/62* (2006.01)
*H01M 10/0525* (2010.01)
*H01M 10/0587* (2010.01)
*H01M 4/525* (2010.01)
*H01M 4/66* (2006.01)
*H01M 4/02* (2006.01)

(52) U.S. Cl.
CPC ... *H01M 10/0525* (2013.01); *H01M 10/0587* (2013.01); *H01M 4/525* (2013.01); *H01M 4/661* (2013.01); *H01M 2004/028* (2013.01)

(58) Field of Classification Search
CPC ............ H01M 4/661; H01M 4/667; H01M 2004/028; H01M 10/0525; H01M 10/0587; H01M 2/263; Y02E 60/10
See application file for complete search history.

(56) References Cited

U.S. PATENT DOCUMENTS

| | | | |
|---|---|---|---|
| 2011/0014510 A1* | 1/2011 | Miyahisa | H01M 10/0431 |
| | | | 429/94 |
| 2013/0089781 A1* | 4/2013 | Miyazaki | H01G 11/28 |
| | | | 429/211 |
| 2016/0190566 A1 | 6/2016 | Shiozaki et al. | |
| 2017/0040649 A1 | 2/2017 | Schmitz et al. | |

FOREIGN PATENT DOCUMENTS

| | | | |
|---|---|---|---|
| JP | 2011-233535 A | | 11/2011 |
| JP | 2013-045659 | * | 3/2013 |
| JP | 2015-69704 A | | 4/2015 |
| JP | 2016-127000 A | | 7/2016 |
| JP | 2017-152222 A | | 8/2017 |
| JP | 2017-208186 A | | 11/2017 |
| JP | 2017-224410 A | | 12/2017 |
| WO | 2015/158755 A1 | | 10/2015 |

* cited by examiner

SECONDARY BATTERY

TECHNICAL FIELD

The present disclosure relates to a secondary battery.

BACKGROUND ART

A non-aqueous electrolyte secondary battery, which achieves charge and discharge by movement of lithium ions between positive and negative electrodes, has a high energy density and a large capacity, and is thus used widely as a power source for driving mobile digital assistants such as mobile phones, laptop computers, and smartphones, or as a power source for engines of electric tools, electric vehicles (EV), hybrid electric vehicles (HEV, PHEV), and the like, and thus wider spread use thereof is expected.

Patent Literature 1 discloses a positive electrode for a non-aqueous electrolyte secondary battery, the positive electrode comprising a protective layer between a positive electrode current collector including aluminum as a main component and a positive electrode mixture layer including a lithium transition metal oxide, the protective layer having a thickness of 1 μm to 5 μm and including: an inorganic compound having a lower oxidizing power than the lithium transition metal oxide; and an electrical conductor. According to Patent Literature 1, in the case where internal short circuit of a battery occurs, in the case where a battery is exposed to a high temperature, or in other cases, there is a possibility that a large amount of heat is generated by the oxidation-reduction reaction between a positive electrode active material and an aluminum collector, but a satisfactory current collectability is kept, and such heat generation due to the oxidation-reduction reaction can be suppressed by the positive electrode for a non-aqueous electrolyte secondary battery, comprising the protective layer.

CITATION LIST

Patent Literature

PATENT LITERATURE 1: Japanese Unexamined Patent Application Publication No. 2016-127000

SUMMARY

A positive electrode of a secondary battery comprises a positive electrode tab, and one end of the positive electrode tab is bonded to an exposed part where a positive electrode active material layer (positive electrode mixture layer) is not formed and a positive electrode current collector is exposed. In addition, the positive electrode tab extends outside the peripheral edge part of the positive electrode current collector, and the other end thereof is welded to a sealing body. An active material layer is expanded/contracted at the time of charging and discharging a secondary battery, so that stress is generated between polar plates. In a secondary battery in which a plurality of layers is provided on the positive electrode current collector, when the edges of a plurality of layers, facing the exposed part, are lined up, the level difference between the plurality of layers and the positive electrode current collector is large, and local stress thus concentrates at the edges of the plurality of layers, so that there is a possibility that deterioration in output characteristics of the secondary battery, due to deformation of a separator or the like, occurs.

Therefore, a secondary battery that suppresses heat generation due to the oxidation-reduction reaction between a positive electrode active material and an aluminum collector at the time of occurrence of abnormality such as internal short circuit, relaxes the local stress near the region where the positive electrode tab is bonded in the positive electrode, and may thereby suppress the deterioration in the output characteristics is demanded.

A secondary battery that is one aspect of the present disclosure is a secondary battery comprising: a positive electrode; a negative electrode; and an electrolyte, wherein the positive electrode comprises: a positive electrode current collector; a positive electrode active material layer including a positive electrode active material composed of a lithium transition metal oxide; a protective layer provided between the positive electrode current collector and the positive electrode active material layer; and a positive electrode tab bonded to the positive electrode current collector at a positive electrode tab bonding part where the positive electrode active material layer and the protective layer are not formed and the positive electrode current collector is exposed, and an edge of the positive electrode active material layer which faces the positive electrode tab and an edge of the protective layer which faces the positive electrode tab are each disposed at a different position in a longitudinal direction of the positive electrode.

A secondary battery that is another aspect of the present disclosure is a secondary battery comprising: a positive electrode; a negative electrode; and an electrolyte, wherein the positive electrode comprises: a positive electrode current collector; a positive electrode active material layer including a positive electrode active material composed of a lithium transition metal oxide; a protective layer provided between the positive electrode current collector and the positive electrode active material layer; positive electrode tab bonding parts where the positive electrode active material layer and the protective layer are not formed and the positive electrode collector is exposed; and a positive electrode tab bonded to the positive electrode current collector at one of positive electrode tab bonding parts, the positive electrode tab bonding parts comprises: positive electrode tab bonding parts form on each surface of the positive electrode current collector, one of positive electrode tab bonding parts is provided on a side where the positive electrode tab is to be bonded the surface of the positive electrode current collector, and the other positive electrode tab bonding parts is provided on a rear surface of the side where the positive electrode tab is to be bonded the surface of the positive electrode current collector, an edge of the positive electrode active material layer disposed on the rear surface and an edge of the protective layer disposed on the rear surface are each disposed at a different position in a longitudinal direction of the positive electrode.

According to the secondary battery of one aspect of the present disclosure, a secondary battery that suppresses the heat generation due to the oxidation-reduction reaction between a positive electrode active material and an aluminum collector at the time of occurrence of abnormality such as internal short circuit, relaxes the local stress near the region where the positive electrode tab is bonded in the positive electrode and, may thereby suppress the deterioration in the output characteristics may be provided.

DESCRIPTION OF EMBODIMENTS

A secondary battery that is one aspect of the present disclosure, comprises: a positive electrode; a negative electrode; and an electrolyte, wherein the positive electrode comprises: a positive electrode current collector; a positive electrode active material layer including a positive electrode active material composed of a lithium transition metal oxide; a protective layer provided between the positive electrode current collector and the positive electrode active material layer; and a positive electrode tab bonded to the positive electrode current collector at a positive electrode tab bonding part where the positive electrode active material layer and the protective layer are not formed and the positive electrode current collector is exposed, and an edge of the positive electrode active material layer which faces the positive electrode tab and an edge of the protective layer which faces the positive electrode tab are each disposed at a different position in a longitudinal direction of the positive electrode. The present inventors have found that in the protective layer and the positive electrode active material layer sequentially provided on the positive electrode current collector, by disposing the edge of the protective layer which faces the positive electrode tab and the edge of the positive electrode active material layer which faces the positive electrode tab, each at a different position in the longitudinal direction of the positive electrode, even in the case where the stress is generated by expansion and contraction of the positive electrode active material layer at the time of charging and discharging, the stress is dispersed to different positions without being allowed to concentrate locally and can thereby be relaxed, so that defects, such as deformation of a separator, that deteriorate the output characteristics of a battery can be avoided even if charging/discharging cycles are repetitively carried out.

Hereinafter, exemplary embodiments of the present disclosure will be described in detail with reference to the drawings. The drawings referred for the description of embodiments are schematically illustrated, and the dimension ratios and the like of the components may be different from the actual things. Specific dimension ratios and the like should be determined in consideration of the description below.

[Secondary Battery]

The secondary battery (hereinafter, also simply referred to as "battery") as one example of the embodiments comprises: a positive electrode; a negative electrode; a separator between the positive electrode and the negative electrode; and an electrolyte. Specifically, the battery has a configuration in which a wound type electrode assembly, in which the positive electrode and the negative electrode are wound together with the separator therebetween, and the electrolyte are housed in an exterior body, such as a battery can and a laminate sheet.

Figure 1:
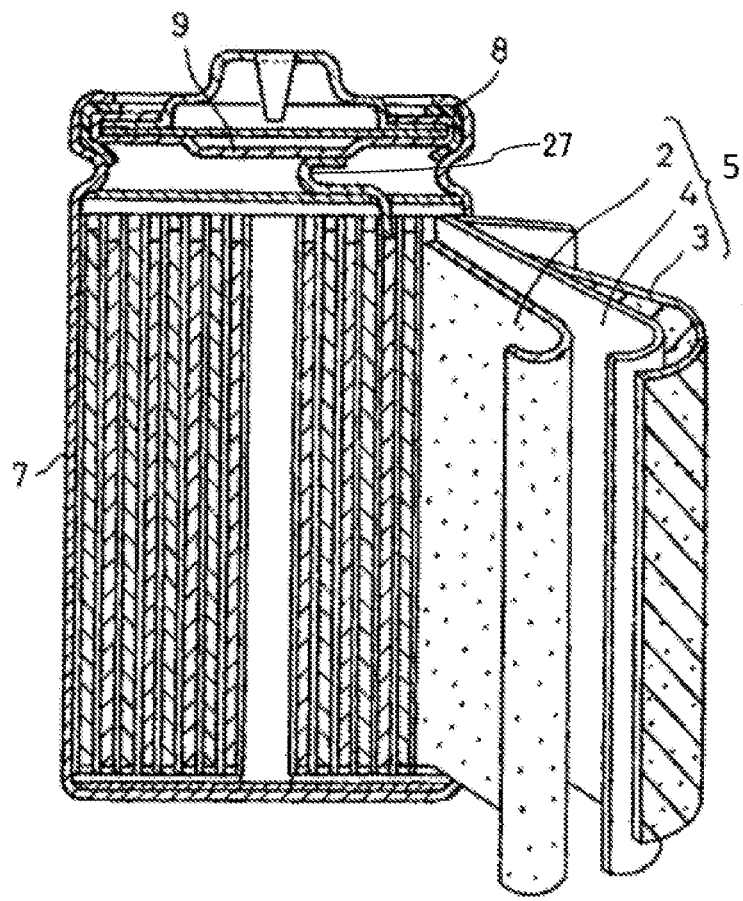
FIG. 1 is a longitudinal sectional view schematically showing a secondary battery as one exemplary embodiment.

FIG. 1 is a longitudinal sectional view schematically showing a battery 1 as one exemplary embodiment. This battery 1 comprises: an electrode assembly 5 in which a positive electrode 2 and a negative electrode 3 are spirally wound with a separator 4 therebetween. The electrode assembly 5 comprising the positive electrode 2, the negative electrode 3, and the separator 4 is housed in a bottomed cylindrical battery case 7 having an opening, and a predetermined amount of an electrolytic solution (e.g. electrolyte such as non-aqueous electrolyte) is injected into the battery case 7 to impregnate the electrode assembly 5. The opening of the battery case 7 is sealed in a tightly closed state by bending the opening of the battery case 7 toward the inside in a radial direction to carry out calking in a state where a sealing body 9 attached to the peripheral edge of a gasket 8 is inserted in the opening. The positive electrode 2 of this battery 1 comprises a positive electrode tab 27, and one end of this positive electrode tab 27 is bonded to a positive electrode tab bonding part 28 of the positive electrode current collector 21 included in the positive electrode 2, as will be described later. In addition, the positive electrode tab 27 extends outside the peripheral edge of the positive electrode current collector 21, and the other end thereof is connected to the sealing body 9 by laser welding or the like.

The battery case 7 for housing the wound type electrode assembly 5 is not limited to one configured by a metal case in a cylindrical shape (cylindrical battery) and, may be configured by a metal case in a shape, such as a rectangular shape (rectangular battery) and a coin shape (coin battery) or may be configured by a rectangular laminate sheet.

Figure 2:
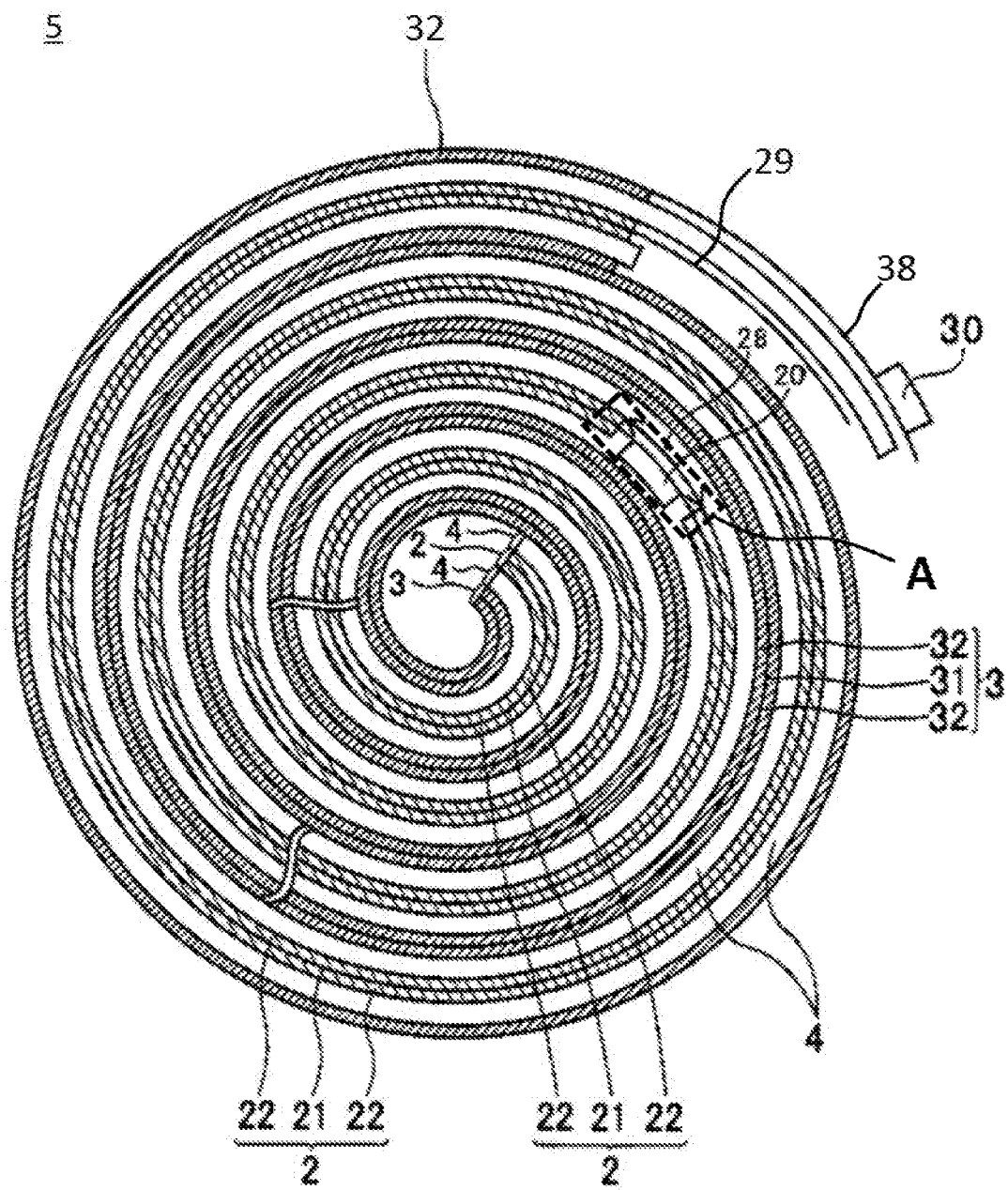
FIG. 2 is a partially transverse sectional view of an electrode assembly configuring a secondary battery as one exemplary embodiment.

FIG. 2 is a partially transverse sectional view of the electrode assembly 5 to be used for the battery 1 as one exemplary embodiment. The belt-like positive electrode 2 included in the electrode assembly 5 comprises: the positive electrode current collector 21; a positive electrode active material layer 22 formed on each side of the positive electrode current collector 21; a protective layer 23 provided between the positive electrode current collector 21 and the positive electrode active material layer 22; and the positive electrode tab 27. The positive electrode current collector 21 has the positive electrode tab bonding part 28 where the positive electrode active material layer 22 and the protective layer 23 are not formed and the positive electrode current collector 21 is exposed, and the positive electrode tab 27 is bonded. The positive electrode tab bonding part 28 is provided on a side where the positive electrode tab 27 is to be bonded, the side being the surface of the positive electrode current collector 21, and on a rear surface of the side where the positive electrode tab 27 is to be bonded, the rear surface being the surface of the positive electrode current collector 21. That is, the positive electrode tab bonding part 28 is formed on each surface of the positive electrode current collector 21. In the electrode assembly 5 shown in FIG. 2, the positive electrode tab bonding part 28 is formed at about the central part in the longitudinal direction of the belt-like positive electrode current collector 21 (region A in FIG. 2). The positive electrode current collector 21 has an exposed part 29, where the protective layer 23 and the positive electrode active material layer 22 are not formed and the positive electrode tab 27 is not bonded, at the end part in the longitudinal direction and on the outermost layer side of the electrode assembly 5. The one end of the positive electrode tab 27 is bonded to one side of the positive electrode tab bonding parts 28.

The belt-like negative electrode 3 included in the electrode assembly 5 comprises: a negative electrode current collector 31; a negative electrode active material layer 32 formed on the negative electrode current collector 31; and a negative electrode tab 30. The negative electrode current collector 31 has a negative electrode tab bonding part 38 where the negative electrode active material layer 32 is not formed and the negative electrode current collector 31 is exposed. The negative electrode tab 30 is bonded to the negative electrode tab bonding part 38 which is at an end part in the longitudinal direction of the negative electrode current collector 31.

Figure 3A:
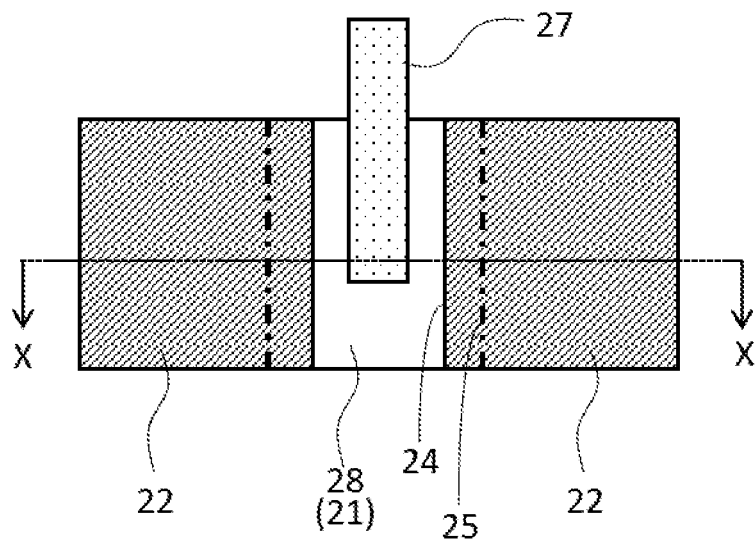
FIG. 3A is a schematic diagram showing one example of a configuration of a positive electrode in the region A in FIG. 2.
Figure 3B:
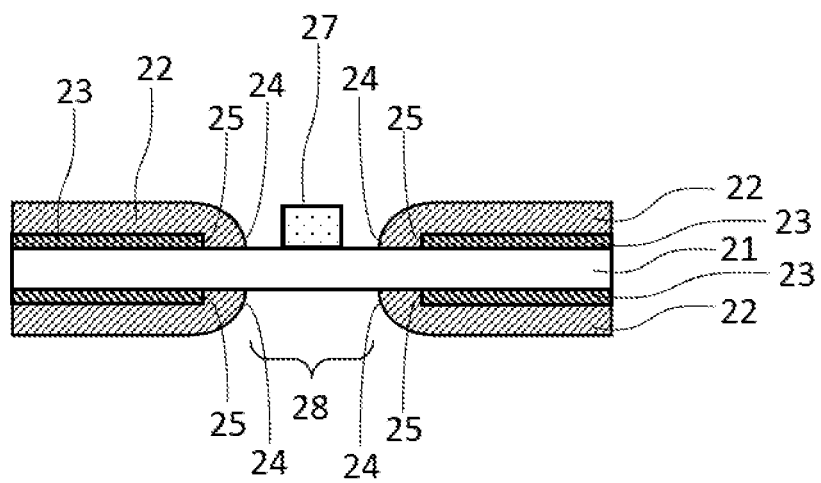
FIG. 3B is a schematic diagram showing one example of a configuration of a positive electrode in the region A in FIG. 2.

FIGS. 3A and 3B are schematic diagrams showing one example of the configuration of the positive electrode 2 in the region A in FIG. 2, FIG. 3A is a partial top view obtained by observing the positive electrode 2 from a principal surface side, and FIG. 3B is a sectional view taken along the line X-X in FIG. 3A.

The positive electrode 2 shown in FIGS. 3A and 3B comprises: the positive electrode current collector 21; the positive electrode active material layer 22 formed on each side of the positive electrode current collector 21; and the protective layer 23 provided between the positive electrode current collector 21 and the positive electrode active material layer 22. In the positive electrode 2, the positive electrode tab bonding part 28 where the positive electrode active material layer 22 and the protective layer 23 are not formed and the positive electrode current collector 21 is exposed is formed, and the positive electrode tab 27 is bonded to the positive electrode tab bonding part 28 on one principal surface side of the positive electrode 2 by ultrasonic welding or the like.

As shown in FIGS. 3A and 3B, on each side of the positive electrode tab bonding part 28 where the positive electrode current collector 21 is exposed, the positive electrode active material layer 22 is formed by being extended on the side of the positive electrode tab 27 so as to cover an edge 25 in the longitudinal direction (horizontal direction in FIGS. 3(a) and (b)) of the protective layer 23, the edge facing the positive electrode tab 27. As a result, a distance between the positive electrode tab 27 and an edge 24 of the positive electrode active material layer 22 is shorter than a distance between the positive electrode tab 27 and the edge 25 of the protective layer 23.

It can be considered that in the battery 1 according to the present embodiment, the edge 24 of the positive electrode active material layer 22 and the edge 25 of the protective layer 23 are each disposed at a different position so as to be deviated from each other in this way, the stress can thereby be dispersed to different positions at the edge 24 of the positive electrode active material layer 22 and the edge 25 of the protective layer 23 without being allowed to concentrate locally even if the stress is generated by the expansion and contraction of the positive electrode active material layer 22 at the time of charging and discharging. Thereby, the stress generated by the expansion and contraction of the positive electrode active material layer 22 can be relaxed in the positive electrode tab bonding part 28 bonded to the positive electrode tab 27 fixed to the sealing body 9, so that such disposition has excellent action that does not cause the defects, such as the deformation of the separator, and can suppress the deterioration in the output characteristics of the battery 1 even if charging/discharging cycles are repetitively carried out.

In contrast, if the edge 24 of the positive electrode active material layer 22 and the edge 25 of the protective layer 23 are lined up in the longitudinal direction, the stress generated between the polar plates by the expansion and contraction of the positive electrode active material layer 22 concentrates at both edges locally and excessive load is applied thereto, and thus there is a possibility that the defects, such as the deformation of the separator, will occur in the course of time by repetitively carrying out charging/discharging cycles and there is concern over the deterioration in the output characteristics of the battery 1.

Figure 4A:
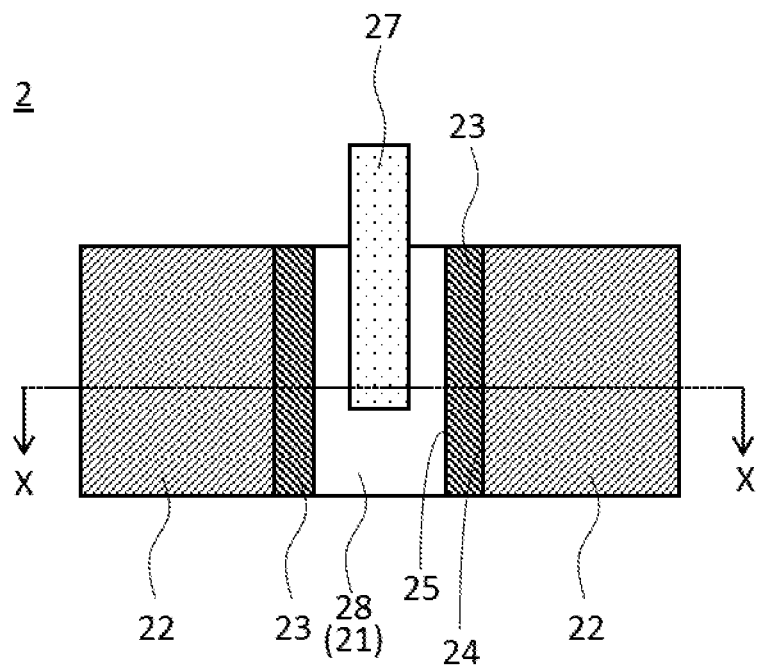
FIG. 4A is a schematic diagram showing another example of a configuration of a positive electrode in the region A in FIG. 2.
Figure 4B:
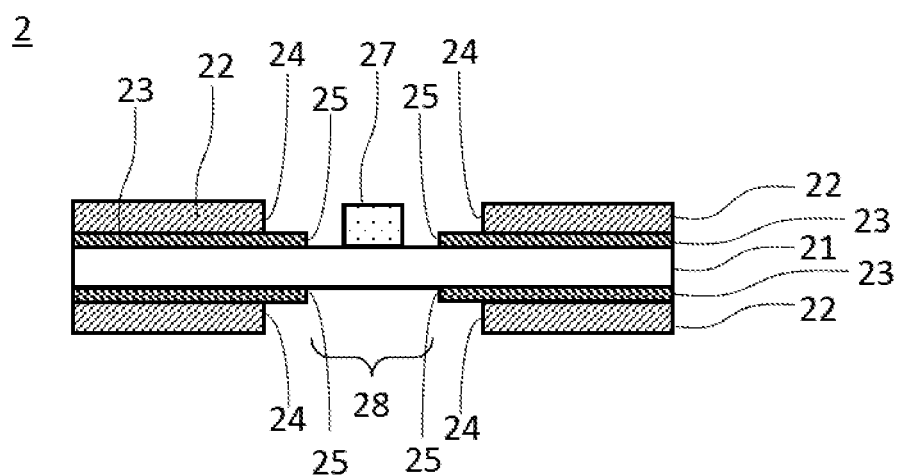
FIG. 4B is a schematic diagram showing another example of a configuration of a positive electrode in the region A in FIG. 2.

FIGS. 4A and 4B are schematic diagrams showing another example of the configuration of the positive electrode 2 in the region A in FIG. 2. FIG. 4A is a partial top view obtained by observing the positive electrode 2 from a principal surface side, and FIG. 4B is a sectional view taken along the line X-X in FIG. 4A.

In the positive electrode 2 shown in FIGS. 4A and 4B, the edge 25 of the protective layer 23 on the side of the positive electrode tab 27 protrudes from the edge 24 of the positive electrode active material layer 22 on the side of the positive electrode tab 27 and a part of the protective layer 23 is exposed on each side of the positive electrode tab bonding part 28 where the positive electrode current collector 21 is exposed. As a result, a distance between the positive electrode tab 27 and the edge 25 of the protective layer 23 is shorter than a distance between the positive electrode tab 27 and the edge 24 of the positive electrode active material layer 22. Also, in the case of the positive electrode 2, as shown in FIGS. 4A and 4B, in which the edge 25 of the protective layer 23 is disposed on the side nearer to the positive electrode tab 27 than the edge 24 is, when the edge 24 of the positive electrode active material layer 22 and the edge 25 of the protective layer 23 are each disposed at a different position so as to be deviated from each other, the stress generated by the expansion and contraction of the positive electrode active material layer 22 can thereby be relaxed in a similar manner as in the positive electrode 2 shown in FIGS. 3A and 3B, so that such disposition has excellent action that does not cause the defects, such as the deformation of the separator, and can suppress the deterioration in the output characteristics of the battery 1 even if charging/discharging cycles are repetitively carried out.

With respect to the battery 1 according to the present embodiment, from the viewpoint of the action of relaxing the stress and suppressing the deterioration in the output characteristics of the battery 1, any of the edge 24 of the positive electrode active material layer 22 and the edge 25 of the protective layer 23 may be disposed on the side nearer to the positive electrode tab 27 as long as the edge 24 of the positive electrode active material layer 22 and the edge 25 of the protective layer 23 are each disposed at a different position. However, when a tension ratio is high, the edge 25 of the protective layer 23 is more preferably disposed at a position nearer to the positive electrode tab 27. On the other hand, when an edge 26 of the positive electrode active material layer 22 is disposed at a position nearer to the positive electrode tab 27, the area of the exposed part of the positive electrode active material layer can thereby be reduced, and a decrease in the battery capacity can thus be suppressed.

The distance between the edge 24 of the positive electrode active material layer 22 and the edge 25 of the protective layer 23 is not particularly limited, but is preferably 0.5 mm or more, and more preferably 2 mm or more. If the distance between the edges is too close, there is a possibility that the action of relaxing the stress is deteriorated.

The above description based on FIGS. 3A, 3B, 4A, and 4B is on the positional relationship between the edge 24 of the positive electrode active material layer 22 and the edge 25 of the protective layer 23 on the surface on the side where the positive electrode tab 27 is to be bonded, the surface being the surface of the positive electrode current collector 21. Also, with respect to positional relationship between the edge 24 of the positive electrode active material layer 22 and the edge 25 of the protective layer 23 on the rear surface of the side where the positive electrode tab 27 is to be bonded, the rear surface being the surface of the positive electrode current collector 21 in FIGS. 3A, 3B, 4A, and 4B, the edges are preferably each disposed at a different position in the longitudinal direction of the positive electrode. This is because also in the rear surface of the face where the positive electrode tab 27 is to be bonded, the rear surface being the surface of the positive electrode current collector 21, if the edge 24 of the positive electrode active material layer 22 on the side of the positive electrode tab 27 and the edge 25 of the protective layer 23 on the side of the positive electrode tab 27 are lined up in the longitudinal direction, the stress generated between the polar plates by the expansion and contraction of the positive electrode active material layer 22 concentrates at both edges locally, so that there is a possibility that the defects, such as the deformation of the separator, occur. When the tension ratio is high, the edge 25 of the protective layer 23 is more preferably disposed at a position nearer to the positive electrode tab 27. On the other hand, when the edge 26 of the positive electrode active material layer 22 is disposed at a position nearer to the positive electrode tab 27, the area of the exposed part of the positive electrode active material layer can be reduced, and the deterioration in the battery capacity can thus be suppressed.

The positive electrode 2 according to the present embodiment can be produced by, for example, the following method. The protective layer 23 is first provided on the surface of the positive electrode current collector 21. The protective layer 23 can be formed by, for example, applying a protective layer slurry obtained by mixing inorganic particles, an electrical conductor, and a binder in a dispersion medium such as N-methyl-2-pyrrolidone (NMP) to the surface of the positive electrode current collector 21 and drying the resulting applying layer. When the positive electrode active material layer 22 is provided on each side of the positive electrode current collector 21, the protective layer 23 is also provided on each side of the positive electrode current collector 21.

Subsequently, the positive electrode active material layer 22 is provided so as to overlay the protective layer 23 provided on the surface of the positive electrode current collector 21. The positive electrode active material layer 22 can be formed by, for example, applying a positive electrode mixture slurry obtained by mixing a positive electrode active material, an electrical conductor, and a binder in a dispersion medium such as N-methyl-2-pyrrolidone (NMP) to a side where the protective layer 23 is formed in the positive electrode current collector 21, drying the resulting applying layer, and rolling the resulting product using a rolling method such as a rolling mill. The method of applying the protective layer slurry and the positive electrode mixture slurry to the positive electrode current collector 21 is not particularly limited, and a well-known applying apparatus, such as a gravure coater, a slit coater, and a die coater, may be used.

In the step of forming the protective layer 23 and the step of forming the positive electrode active material layer 22, the positive electrode tab bonding part 28 where the positive electrode current collector 21 is exposed and the positive electrode tab 27 is to be bonded is formed by providing a region where any of the protective layer shiny and the positive electrode mixture slurry is not applied at the central part in the longitudinal direction of the positive electrode current collector 21. Moreover, in the step of forming the protective layer 23 and the step of forming the positive electrode active material layer 22, when the applying film of each slurry is formed, the region where each slurry is to be applied, the amount of each slurry to be applied, and the like are adjusted so that the edges of respective applying films on the side of the positive electrode tab 27 are mutually positioned so as to have a predetermined interval.

After the positive electrode active material layer 22 is formed on the positive electrode current collector 21 on which the protective layer 23 has been formed, one end of the positive electrode tab 27 is welded by ultrasonic welding or the like to the positive electrode tab bonding part 28 provided at the central part in the longitudinal direction of the positive electrode current collector 21. Thereby, the positive electrode 2 according to the present embodiment, in which the protective layer 23 and the positive electrode active material layer 22 are formed in sequence on the surface of the positive electrode current collector 21, and the positive electrode tab 27 is bonded to the positive electrode tab bonding part 28 where the positive electrode current collector 21 is exposed, can be produced.

In the above embodiment, a cylindrical secondary battery having a configuration in which one positive electrode tab bonding part 28 to which the positive electrode tab 27 is bonded is provided at the central part in the longitudinal direction of the belt-like positive electrode current collector 21 has been described, but the configuration is not limited to this configuration. For example, the configuration may be such that the positive electrode tab 27 to be bonded to the positive electrode is provided at an end part on the winding end side of the belt-like positive electrode current collector 21 or provided at an end part on the winding start side of the belt-like positive electrode current collector 21. The configuration may also be such that a plurality of positive electrode tabs 27 is provided at a plurality of positions on the belt-like positive electrode current collector 21.

Hereinafter, the configurations, materials, and the like of the positive electrode 2, the negative electrode 3, the separator 4, and the electrolyte each configuring the battery 1 according to the present embodiment will be described in detail, but these are examples, and as the positive electrode 2, the negative electrode 3, the separator 4, and the electrolyte, those which are known may be used.

[Positive Electrode]

The positive electrode 2 comprises: the positive electrode current collector 21; the positive electrode active material layer 22; and the protective layer 23 provided between the positive electrode current collector 21 and the positive electrode active material layer 22. Foil of a metal, such as an aluminum simple substance or an aluminum alloy, that is stable in the electric potential range of the positive electrode, a film with such a metal disposed on an outer layer, and the like can be used for the positive electrode current collector 21. The thickness of the positive electrode current collector 21 is not particularly limited, and is, for example, about 10 μm or more and about 100 μm or less.

The positive electrode active material layer 22 includes a positive electrode active material composed of a lithium transition metal oxide. Examples of the lithium transition metal oxide include a lithium transition metal oxide containing: lithium (Li); and a transition metal element, such as cobalt (Co), manganese (Mn), and nickel (Ni). The lithium transition metal oxide may include another additive element in addition to Co, Mn, and Ni, and examples thereof include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M represents at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These may be used singly or in combinations of two or more thereof.

The positive electrode active material layer 22 suitably further includes an electrical conductor and a binder. The electrical conductor included in the positive electrode active material layer 22 is used for enhancing the electrical conductivity of the positive electrode active material layer 22. Examples of the electrical conductor include carbon materials such as carbon black (CB), acetylene black (AB), Ketjenblack, and graphite. These may be used singly or in combinations of two or more thereof.

The binder included in the positive electrode active material layer 22 is used for keeping a satisfactory state of contact between the positive electrode active material and the electrical conductor and enhancing the binding performance of the positive electrode active material and the like to the surface of the positive electrode current collector 21. Examples of the binder include fluorocarbon resins such as polytetrafluoroethylene (PTFE) and poly(vinylidene fluoride) (PVdF), polyacrylonitrile (PAN), polyimide resins, acrylic resins, and polyolefin resins. These resins may be combined with carboxymethyl cellulose (CMC) or a salt thereof (such as CMC-Na, CMC-K, and CMC-$NH_4$, or may be a partially neutralized salt), polyethylene oxide (PEO), or the like. These may be used singly or in combinations of two or more thereof.

The protective layer 23 is provided between the positive electrode current collector 21 and the positive electrode active material layer 22 in the positive electrode 2, and includes inorganic compound particles (hereinafter, also simply referred to as "inorganic particles") and an electrical conductor. The protective layer 23 includes the inorganic particles and is provided between the positive electrode current collector 21 and the positive electrode active material layer 22, thereby serving a function of isolating the positive electrode current collector 21 from the positive electrode active material layer 22 and suppressing the oxidation-reduction reaction between aluminum included in the positive electrode current collector 21 and the lithium transition metal oxide included as a positive electrode active material in the positive electrode active material layer 22.

The inorganic particles included in the protective layer 23 are particles composed of an inorganic compound. For example, the protective layer 23 includes as the inorganic compound composing the inorganic particles at least one selected from the group consisting of metal oxides, metal hydroxides, metal carbides, metal nitrides, and metal borides. Examples of the metal oxides include aluminum oxide, titanium oxide, zirconium oxide, silicon oxide, manganese oxide, magnesium oxide, and nickel oxide. Examples of the metal hydroxides include aluminum hydroxide, boehmite, and magnesium hydroxide. Examples of the metal nitrides include titanium nitride, boron nitride, aluminum nitride, magnesium nitride, and silicon nitride. Examples of the metal carbides include silicon carbide, boron carbide, titanium carbide, and tungsten carbide. Examples of metal borides include titanium boride, zirconium boride, tungsten boride, and molybdenum boride. Among these, the protective layer preferably includes at least any one of $Al_2O_3$, AlOOH, $TiO_2$, $ZrO_2$, $SiO_2$, $MnO_2$, MgO, $Si_3N_4$, and BN from the viewpoint of non-conductivity, a high melting point and the like.

The electrical conductor included in the protective layer 23 is used for securing a satisfactory current collectability of the positive electrode 2. Examples of the electrical conductor include the same types of the electrical conductors that can be used in the positive electrode active material layer 22. Those may be used singly or in combinations of two or more thereof. In addition, the protective layer 23 preferably includes a binder for securing the mechanical strength of the protective layer 23 and enhancing the bonding performance between the protective layer 23 and the positive electrode current collector 21. Examples of the binder included in the protective layer 23 include the same types of the binders that can be used in the positive electrode active material layer 22. Those may be used singly or in combinations of two or more thereof.

The thickness of the protective layer 23 is not particularly limited, but the average thickness is preferably 1 μm or more and 5 μm or less, and more preferably 1.5 μm or more and 5 μm or less. This is because when the thickness of the protective layer 23 is in the range, the balance between suppression of the heat generation due to the oxidation-reduction reaction and a satisfactory current collectability is excellent.

[Negative Electrode]

The negative electrode 3 includes, for example, a negative electrode current collector 31 formed of metal foil or the like and a negative electrode active material layer 32 formed on the surface of the collector. Foil of a metal, such as copper, that is stable in the electric potential range of the negative electrode, a film with such a metal disposed on an outer layer, and the like can be used for the negative electrode current collector 31. The negative electrode active material layer 32 suitably includes a binder in addition to a negative electrode active material. The negative electrode 3 can be produced by, for example, applying a negative electrode mixture slurry including the negative electrode active material, the binder, and other components to the negative electrode current collector 31, drying the resulting applying layer, and rolling the resulting product to form a negative electrode active material layer 32 on each side of the collector.

The negative electrode active material is not particularly limited as long as it is a compound that can reversibly intercalate and deintercalate lithium ions, and, for example, a carbon material, such as natural graphite and artificial graphite, a metal, such as silicon (Si) and tin (Sn), that can be alloyed with lithium, an alloy or composite oxide including a metal element, such as Si and Sn, or the like can be used. The negative electrode active materials can be used singly or in combinations of two or more thereof.

As the binder included in the negative electrode active material layer 32, similarly to the case of the positive electrode 2, a fluorocarbon resin such as PTFE, PAN, a polyimide resin, an acrylic resin, a polyolefin resin, or the like can be used. When the negative electrode mixture slurry is prepared using an aqueous solvent, styrene-butadiene rubber (SBR), CMC or its salt, poly(acrylic acid) (PAA) or its salt (such as PAA-Na and PAA-K, or may be a partially neutralized salt), poly(vinyl alcohol) (PVA), or the like is preferably used.

[Separator]

An ion-permeable and insulating porous sheet or the like is used as the separator 4. Specific examples of the porous sheet include a microporous thin film, woven fabric, and nonwoven fabric. Suitable examples of the material for the separator 4 include olefin resins such as polyethylene and polypropylene, and cellulose. The separator 4 may be a laminate including a cellulose fiber layer and a layer of fibers of a thermoplastic resin such as an olefin resin. The separator 4 may be a multi-layered separator including a polyethylene layer and a polypropylene layer, and the separator 4 a surface of which is coated with a resin such as an aramid resin or a ceramic may also be used.

[Electrolyte]

The electrolyte includes a solvent and an electrolyte salt dissolved in the solvent. As the solvent, for example, a non-aqueous solvent such as an ester, an ether, a nitrile such as acetonitrile, an amide such as dimethylformamide, and a mixed solvent of two or more of these solvents can be used. A non-aqueous solvent may contain a halogen-substituted product formed by replacing at least part of hydrogen atoms of any of the above solvents with a halogen atom such as fluorine. As the electrolyte, a solid electrolyte using a gel polymer or the like may be used Examples of the ester include cyclic carbonate esters such as ethylene carbonate (EC), propylene carbonate (PC), and butylene carbonate; chain carbonate esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), ethyl propionate, and γ-butyrolactone.

Examples of the ether include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted product, a fluorinated cyclic carbonate ester such as fluoroethylene carbonate (EEC), a fluorinated chain carbonate ester, a fluorinated chain carboxylate ester such as methyl fluoropropionate (FMP), or the like is preferably used.

The electrolyte salt of the electrolyte is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiCl, LiBr, LH, chloroborane lithium, lithium short-chain aliphatic carboxylates, borate salts such as $Li_2B_4O_7$ and $Li(B(C_2O_4)F_2)$, and imide salts such as $LiN(SO_2CF_3)_2$ and $LiN(C_1F_{2l+1}SO_2)$ $(C_mF_{2m+1}SO_2)$ {where l and m are integers of 1 or more}. These may be used singly or in combinations of two or more thereof. Among these, $LiPF_6$ is preferably used from the viewpoint of ionic conductivity, electrochemical stability, and the like. The concentration of the lithium salt is preferably set to 0.5 mol or more and 2.0 mol or less per 1 L of a solvent.

EXAMPLES

The present disclosure will further be described with Examples.

Example 1

[Production of Positive Electrode]

A protective layer slurry was prepared by mixing 92 parts by mass of inorganic particles composed of α-alumina, 5 parts by mass of acetylene black (AB), and 3 parts by mass of poly(vinylidene fluoride) (PVdF), and, further, adding an appropriate amount of N-methyl-2-pyrrolidone (NMP). Next, the protective layer slurry was applied on each side of a belt-like positive electrode current collector 21 formed of aluminum foil. Subsequently, the resulting applying film was dried to thereby form a protective layer 23.

A positive electrode mixture slurry was prepared by mixing 97 parts by mass of a lithium nickel composite oxide, as a positive electrode active material, represented by $LiNi_{0.8}Co_{0.15}Al_{0.03}O_2$, 1.5 parts by mass of acetylene black (AB), and 1.5 parts by mass of poly(vinylidene fluoride) (PVdF), and, further, adding an appropriate amount of N-methyl-2-pyrrolidone. Next, the positive electrode mixture slurry was applied on each side of the positive electrode current collector 21 having the protective layer 23 formed on each side thereof. At this time, the positive electrode mixture slurry was applied so that the edge 25 of the protective layer 23 was covered by the applying film of the positive electrode mixture shiny at the exposed part where the protective layer 23 was not formed and the positive electrode current collector 21 was exposed, the exposed part provided at the central part in the longitudinal direction of the positive electrode current collector 21.

Subsequently, after the applying film of the positive electrode mixture slurry was dried, the resulting product was cut into a predetermined electrode size and then rolled using a rolling mill. Thereby, a positive electrode 2 according to Example 1 was produced. The positive electrode 2 according to Example 1 has the protective layer 23 and the positive electrode active material layer 22 formed in sequence on each side of the positive electrode current collector 21. In the positive electrode 2 according to Example 1, the edge 24 of the positive electrode active material layer 22 on the side of the positive electrode tab 27 was disposed at a position nearer to the inside of the positive electrode tab bonding part 28 than the edge 25 of the protective layer 23 on the side of the positive electrode tab 27 was, and the distance between the edges was 2 mm.

[Production of Negative Electrode]

A negative electrode mixture slurry was prepared by mixing 100 parts by mass of a graphite powder, 1 part by mass of carboxymethyl cellulose (CMC), and 1 part by mass of styrene-butadiene rubber (SBR), and further, adding an appropriate amount of water. Next, the negative electrode mixture slurry was applied on each side of the negative electrode current collector 31 formed of copper foil, and the applied slurry was dried. The resulting product was cut into a predetermined electrode size and then rolled using a rolling mill to produce a negative electrode 3 having a negative electrode active material layer 32 formed on each side of the negative electrode current collector 31.

[Production of Electrolyte]

Ethylene carbonate (EC), methyl ethyl carbonate (EMC), and dimethyl carbonate (DMC) were mixed in a volume ratio of 3:3:4. LiPF$_6$ was dissolved in the mixed solvent at a concentration of 1.2 mol/L to produce a non-aqueous electrolyte.

[Production of Battery]

One end of an aluminum positive electrode tab 27 was attached to the positive electrode tab bonding part 28 of the positive electrode 2, and one end of a nickel negative electrode tab was attached to the negative electrode tab bonding part 38 of the negative electrode 3. The positive electrode 2 and the negative electrode 3 were spirally wound through the separator 4 formed of a microporous polyethylene film to produce a wound type electrode assembly 5.

The electrode assembly 5 was housed in the main body of a battery case 7 having a bottomed cylindrical shape, the main body having an outer diameter of 18 mm and a height of 65 mm, and after the non-aqueous electrolyte was injected thereinto, the opening of the main body of the battery case 7 was sealed by the gasket 8 and the sealing body 9 to produce a cylindrical battery 1 of an 18650 type, the battery having a tension ratio of 0.99. The tension ratio refers to a ratio of the outer diameter of the wound type electrode assembly 5 to the inner diameter of the main body of the battery case 7.

Example 2

A positive electrode 2 according to Example 2 was produced so that the edge 25 of the protective layer 23 on the side of the positive electrode tab 27 was disposed at a position nearer to the inside of the bonding part for the positive electrode 27 than the edge 24 of the positive electrode active material layer 22 on the side of the positive electrode tab 27 was, and the distance between the edges was 2 mm. In Example 2, a cylindrical battery 1 of an 18650 type, the battery having a tension ratio of 0.99, was produced in the same manner as in Example 1, except that the region where each slurry for the positive electrode 2 was applied, and the like were adjusted.

Comparative Example 1

A positive electrode according to Comparative Example 1 was produced so that the positions of the edge of the protective layer on the side of the positive electrode tab and the edge of the positive electrode active material layer on the side of the positive electrode tab almost coincided. In Comparative Example 1, a cylindrical non-aqueous electrolyte secondary battery of an 18650 type, the battery having a tension ratio of 0.99, was produced in the same manner as in Example 1, except that the region where each slurry for the positive electrode was applied, and the like were adjusted.

Example 3

A battery 1 was produced in the same manner as in Example 1, except that the lengths in the longitudinal direction of the positive electrode 2, the negative electrode 3, and/or the separator 4 were adjusted in the step of producing the battery 1 so that the tension ratio was 0.97.

Example 4

A battery 1 was produced in the same manner as in Example 2, except that the lengths in the longitudinal direction of the positive electrode 2, the negative electrode 3, and/or the separator 4 were adjusted in the step of producing the battery 1 so that the tension ratio was 0.97.

Comparative Example 2

A non-aqueous electrolyte secondary battery was produced in the same manner as in Comparative Example 1, except that the lengths in the longitudinal direction of the positive electrode, the negative electrode, and/or the separator were adjusted in the step of producing the non-aqueous electrolyte secondary battery so that the tension ratio was 0.97.

Example 5

A battery 1 was produced in the same manner as in Example 1, except that the lengths in the longitudinal direction of the positive electrode 2, the negative electrode 3, and/or the separator 4 were adjusted in the step of producing the battery 1 so that the tension ratio was 0.90.

Example 6

A battery 1 was produced in the same manner as in Example 2, except that the lengths in the longitudinal direction of the positive electrode 2, the negative electrode 3, and/or the separator 4 were adjusted in the step of producing the battery 1 so that the tension ratio was 0.90.

Comparative Example 3

A non-aqueous electrolyte secondary battery was produced in the same manner as in Comparative Example 1, except that the lengths in the longitudinal direction of the positive electrode, the negative electrode, and/or the separator were adjusted in the step of producing the non-aqueous electrolyte secondary battery so that the tension ratio was 0.90.

[Output Characteristic Test]

The initial discharge capacity of each secondary battery produced above was measured. After a constant current charging was carried out at a battery temperature of 25° C., at a current of 800 mA to a voltage value of 4.1 V using each secondary battery, a constant current discharging was carried out at a current of 800 mA to a voltage value of 2.5 V was carried out. The discharge capacity at the time when this constant current discharging was carried out was defined as the initial discharge capacity of each secondary battery.

Next, a cycle characteristic test was carried out for each secondary battery. 1500 charging/discharging cycles were repetitively carried out on each secondary battery at a temperature of 25° C., a single charging/discharging cycle consisting of a constant current charging of a battery at a current of 800 mA to 4.1 V, a quiescent period of 15 minutes, a constant current discharging of a battery at a current of 800 mA to 2.5 V, and another quiescent period of 15 minutes. Measurement of the discharge capacity of each secondary battery after the cycle characteristic test was carried out after the 1500 charging/discharging cycles in the same manner as in the measurement of the initial discharge capacity.

For each secondary battery, a ratio (percentage) of the discharge capacity after the cycle characteristic test to the initial discharge capacity was calculated as a discharge capacity retention ratio, and the output characteristic of each secondary battery was evaluated according to this discharge capacity retention ratio.

Table 1 shows the results of the discharge output characteristic in the secondary batteries of Examples 1 and 2, and Comparative Example 1, Table 2 shows the results of the discharge output characteristic in the secondary batteries of Examples 3 and 4, and Comparative Example 2, and Table 3 shows the results of the discharge output characteristic in the secondary batteries of Examples 4 and 5, and Comparative Example 3. The secondary batteries of Table 1 have a tension ratio of 0.99. The secondary batteries of Table 2 have a tension ratio of 0.97. The secondary batteries of Table 3 have a tension ratio of 0.90.

TABLE 1

| | Positive electrode configuration (layer nearer to positive electrode tab) | Edge interval [mm] | Tension ratio | Discharge capacity retention ratio [%] |
|---|---|---|---|---|
| Example 1 | Positive electrode active material layer | 2 | 0.99 | 90 |
| Example 2 | Protective layer | 2 | 0.99 | 97 |
| Comparative Example 1 | Almost coincide | 0 | 0.99 | 85 |

TABLE 2

| | Positive electrode configuration (layer nearer to positive electrode tab) | Edge interval [mm] | Tension ratio | Discharge capacity retention ratio [%] |
|---|---|---|---|---|
| Example 3 | Positive electrode active material layer | 2 | 0.97 | 95 |
| Example 4 | Protective layer | 2 | 0.97 | 98 |
| Comparative Example 2 | Almost coincide | 0 | 0.97 | 85 |

TABLE 3

| | Positive electrode configuration (layer nearer to positive electrode tab) | Edge interval [mm] | Tension ratio | Discharge capacity retention ratio [%] |
|---|---|---|---|---|
| Example 5 | Positive electrode active material layer | 2 | 0.90 | 98 |
| Example 6 | Protective layer | 2 | 0.90 | 98 |
| Comparative Example 3 | Almost coincide | 0 | 0.90 | 90 |

As is clear from the results in Table 1 to Table 3, when Examples and Comparative Examples where the tension ratio is the same are compared, it has been found that the batteries 1 of the Examples in which the protective layer 23 is provided between the positive electrode current collector 21 and the positive electrode active material layer, and the edge 24 of the positive electrode active material layer 22 on the side of the positive electrode tab 27 and the edge 25 of the protective layer 23 on the side of the positive electrode tab 27 are each disposed at a different position in the longitudinal direction of the positive electrode have an excellent discharge capacity retention ratio after the cycle characteristic test and can suppress the deterioration in the output characteristic, as compared to secondary batteries of the Comparative Examples where the edge of the positive electrode active material layer on the side of the positive electrode tab and the edge of the protective layer on the side of the positive electrode tab almost coincide.

When Examples 1 and 2 are compared, Examples 3 and 4 are compared, and Examples 5 and 6 are compared, it has been found that the higher the tension ratio is, the higher discharge capacity retention ratio and the more excellent effect of suppressing the deterioration in the output characteristic the batteries 1 of the Examples where the edge 25 of the protective layer 23 on the side of the positive electrode tab 27 is nearer to the positive electrode tab 27 than the edge 24 of the positive electrode active material layer 22 on the side of the positive electrode tab 27 exhibit and have than the batteries 1 of the Examples where the edge 24 of the positive electrode active material layer 22 on the side of the positive electrode tab 27 is nearer to the positive electrode tab 27 than the edge 25 of the protective layer 23 on the side of the positive electrode tab 27 is. It can be considered that this is because the nearer to 1 the tension ratio is, the higher the capacitance density of the battery 1 is, but the smaller the space inside the battery case 7 is, making a possibility of occurrence of the deformation of the separator, or the like due to the expansion/contraction of the active material at the time of charging and discharging higher.

In the cylindrical secondary batteries described in Examples and Comparative Examples, the positive electrode tab is fixed to the sealing body, and it is thus difficult to relax or release the stress generated between the polar plates by the expansion/contraction of the active material at the time of charging and discharging. Therefore, in the case where the edges of a plurality of layers, the edges facing the positive electrode tab connecting part, are lined up, the deterioration in the output characteristic due to the local concentration of the stress on the edges of a plurality of layers is a more serious problem for a cylindrical secondary battery. However, as described above, it has been found that the cylindrical batteries 1 of the Examples can improve the discharge capacity retention ratio after the cycle characteristic test and can suppress the deterioration in the output characteristic, as compared to the secondary batteries of the Comparative Examples where the edge of the positive electrode active material layer on the side of the positive electrode tab and the edge of the protective layer on the side of the positive electrode tab almost coincide in the longitudinal direction of the positive electrode. It can be considered that this is because by disposing the edge 24 of the positive electrode active material layer 22 and the edge 25 of the protective layer 23 each at a different position near the positive electrode tab bonding part 28, the stress is dispersed to different positions without being allowed to concentrate locally and can thereby be relaxed, so that the defects, such as the deformation of the separator, that deteriorate the output characteristic of the battery can be avoided even if the charging/discharging cycles are repetitively carried out.

REFERENCE SIGNS LIST 1 secondary battery (battery)
2 positive electrode
3 negative electrode
4 separator
5 electrode assembly
7 battery case
8 gasket
9 sealing body
21 positive electrode current collector
22 positive electrode active material layer
23 protective layer
24, 25 edge
27 positive electrode tab 28 positive electrode tab bonding part
29 exposed part
30 negative electrode tab
31 negative electrode current collector
32 negative electrode active material layer
38 negative electrode tab bonding part

The invention claimed is:

1. A secondary battery, comprising:
a positive electrode;
a negative electrode; and
an electrolyte, wherein
the positive electrode comprises:
a positive electrode collector;
a positive electrode active material layer including a positive electrode active material composed of a lithium transition metal oxide;
a protective layer provided between the positive electrode collector and the positive electrode active material layer; and
a positive electrode tab bonded to the positive electrode collector at a positive electrode tab bonding part where the positive electrode active material layer and the protective layer are not formed and the positive electrode collector is exposed, and
an edge of the positive electrode active material layer which faces the positive electrode tab and an edge of the protective layer which faces the positive electrode tab are each disposed at a different position in a longitudinal direction of the positive electrode.

2. The secondary battery according to claim 1, wherein a distance between the positive electrode tab and the edge of the positive electrode active material layer is shorter than a distance between the positive electrode tab and the edge of the protective layer.

3. The secondary battery according to claim 1, wherein a distance between the positive electrode tab and the edge of the protective layer is shorter than a distance between the positive electrode tab and the edge of the positive electrode active material layer.

4. The secondary battery according to claim 1, wherein the protective layer includes an inorganic compound being at least one selected from a group consisting of metal oxides, metal hydroxides, metal carbides, metal nitrides, and metal borides.

5. The secondary battery according to claim 1, wherein the protective layer includes an electrical conductor and a binder.

6. The secondary battery according to claim 1, wherein a thickness of the protective layer is 1 μm or more and 5 μm or less.

7. The secondary battery according to claim 1, wherein the secondary battery is a cylindrically shaped secondary battery, and wherein an electrode assembly comprising the positive electrode, the negative electrode, and a separator is housed in a cylindrical battery case, and the positive electrode tab is welded to a sealing body included in the battery case.

8. A secondary battery, comprising:
a positive electrode;
a negative electrode; and
an electrolyte, wherein
the positive electrode comprises:
a positive electrode collector;
a positive electrode active material layer including a positive electrode active material composed of a lithium transition metal oxide;
a protective layer provided between the positive electrode collector and the positive electrode active material layer;
positive electrode tab bonding parts where the positive electrode active material layer and the protective layer are not formed and the positive electrode collector is exposed; and
a positive electrode tab bonded to the positive electrode collector at one of positive electrode tab bonding parts,
the positive electrode tab bonding parts comprises:
positive electrode tab bonding parts form on each surface of the positive electrode current collector,
one of positive electrode tab bonding parts is provided on a side where the positive electrode tab is to be bonded to an area of the surface of the positive electrode current collector free of the positive electrode active material layer and the protective layer, and
the other positive electrode tab bonding parts is provided on a rear surface of the side where the positive electrode tab is to be bonded to the area of the surface of the positive electrode current collector free of the positive electrode active material layer and protective layer,
an edge of the positive electrode active material layer disposed on the rear surface and an edge of the protective layer disposed on the rear surface are each disposed at a different position in a longitudinal direction of the positive electrode.

9. The secondary battery according to claim 8, wherein a distance between the positive electrode tab and the edge of the positive electrode active material layer is shorter than a distance between the positive electrode tab and the edge of the protective layer.

10. The secondary battery according to claim 8, wherein a distance between the positive electrode tab and the edge of the protective layer is shorter than a distance between the positive electrode tab and the edge of the positive electrode active material layer.

11. The secondary battery according to claim 8, wherein the protective layer includes an inorganic compound being at least one selected from a group consisting of metal oxides, metal hydroxides, metal carbides, metal nitrides, and metal borides.

12. The secondary battery according to claim 8, wherein the protective layer includes an electrical conductor and a binder.

13. The secondary battery according to claim 8, wherein a thickness of the protective layer is 1 μm or more and 5 μm or less.

14. The secondary battery according to claim 8, wherein the secondary battery is a cylindrically shaped secondary battery, and wherein an electrode assembly comprising the positive electrode, the negative electrode, and a separator is housed in a cylindrical battery case, and the positive electrode tab is welded to a sealing body included in the battery case.

* * * * *